US009729312B2

(12) United States Patent
Bathen

(10) Patent No.: US 9,729,312 B2
(45) Date of Patent: Aug. 8, 2017

(54) SYSTEM AND METHOD FOR HIGH-ASSURANCE DATA STORAGE AND PROCESSING BASED ON HOMOMORPHIC ENCRYPTION

(71) Applicant: United States Government as represented by the Secretary of the Navy, Washington, DC (US)

(72) Inventor: Luis Angel D. Bathen, San Jose, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 245 days.

(21) Appl. No.: 14/697,785

(22) Filed: Apr. 28, 2015

(65) Prior Publication Data
US 2016/0323098 A1 Nov. 3, 2016

(51) Int. Cl.
*H04L 9/08* (2006.01)
*H04L 9/00* (2006.01)
*G06F 9/455* (2006.01)
*H04L 29/06* (2006.01)

(52) U.S. Cl.
CPC .......... *H04L 9/008* (2013.01); *G06F 9/45558* (2013.01); *H04L 63/00* (2013.01); *G06F 2009/45587* (2013.01)

(58) Field of Classification Search
CPC ...................................................... H04L 9/008
See application file for complete search history.

(56) References Cited

U.S. PATENT DOCUMENTS

| 8,250,376 | B2 | 8/2012 | Osaki |
|---|---|---|---|
| 8,335,915 | B2 | 12/2012 | Plotkin et al. |
| 2011/0060917 | A1 | 3/2011 | Pastoriza et al. |
| 2011/0110525 | A1 | 5/2011 | Gentry |
| 2011/0243320 | A1 | 10/2011 | Halevi et al. |
| 2011/0264920 | A1 | 10/2011 | Rieffel et al. |
| 2012/0039473 | A1 | 2/2012 | Gentry et al. |

(Continued)

OTHER PUBLICATIONS

NSA Research Directorate Staff; Securing the cloud with homomorphic encryption; The Next Wave, vol. 20 No. 3, 2014.

*Primary Examiner* — Kambiz Zand
*Assistant Examiner* — Thanh Le
(74) *Attorney, Agent, or Firm* — SPAWAR Systems Center Pacific; Kyle Eppele; J. Eric Anderson

(57) ABSTRACT

A key value storage (KVS) system comprising: a client-side agent configured to encrypt data; three nodes hosted respectively in three cloud service providers, wherein each node comprises: a management node configured to receive encrypted data from the client-side agent, a homomorphic encryption (HE) key manager configured to fetch a public key of a given object in the KVS system, a homomorphic encryption and processing engine configured to execute commands over the encrypted data without decrypting it, a homomorphic memory store, a hypervisor configured to monitor performance of the management node in order to assess the quality of service of the management node; and wherein each node serves on a rotating basis in a master node role, a secondary node role, or a back-up node role, wherein the nodes rotate their roles when the master node's hypervisor detects a reduced quality of service of the master node's management node.

19 Claims, 13 Drawing Sheets

(56) References Cited

U.S. PATENT DOCUMENTS

| | | | |
|---|---|---|---|
| 2013/0097417 A1* | 4/2013 | Lauter | H04L 9/008 |
| | | | 713/150 |
| 2013/0103646 A1 | 4/2013 | Nagpal et al. | |
| 2013/0227558 A1* | 8/2013 | Du | G06F 9/45558 |
| | | | 718/1 |
| 2013/0336104 A1* | 12/2013 | Talla | H04L 45/245 |
| | | | 370/216 |
| 2014/0348326 A1 | 11/2014 | Meyer et al. | |
| 2015/0026108 A1* | 1/2015 | Portegys | G06F 9/5083 |
| | | | 706/21 |

* cited by examiner

SYSTEM AND METHOD FOR HIGH-ASSURANCE DATA STORAGE AND PROCESSING BASED ON HOMOMORPHIC ENCRYPTION

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 102930.

CROSS-REFERENCE TO RELATED APPLICATION

This application is related to U.S. Application No.: UNKNOWN, filed EVEN DATE, titled "Cybernaut: A Cloud-Oriented Energy-Efficient Intrusion-Tolerant Hypervisor" (Navy Case #102492), which application is hereby incorporated by reference herein in its entirety for its teachings.

BACKGROUND OF THE INVENTION

This invention relates to the field of data storage and processing. Data storage systems are critical to the information age. With over 100 terabytes of data uploaded to the internet on a daily basis (as of 2012), and with 35 zettabytes of data expected to have been generated by 2020, storage systems will need to be able to cope with the ever growing demand for resources. There is a growing amount of data that interacts with cloud computing service providers. As the volume of data generated increases in this information age, so does the need to be able to protect the data, and make sure such data is available 24/7. Moreover, over the past decade, data breaches and theft episodes are being reported all over the world. This means that the problem is twofold: 1) data availability is critical in the information age, and 2) more data, means more sensitive data, therefore, data theft becomes a much bigger issue, as more and more records containing personal/sensitive information are being generated and uploaded to the web.

SUMMARY

Described herein is a key value storage (KVS) system comprising: a client-side agent and first, second, and third nodes. The client-side agent is configured to encrypt data, and only the client-side agent can decrypt the data. The first, second, and third nodes are hosted respectively in first, second, and third cloud service providers. Each of the first, second, and third nodes comprises: a management node, a homomorphic encryption (HE) key manager, a homomorphic encryption and processing engine, a homomorphic memory store, and a hypervisor. Each management node is configured to receive encrypted data from the client-side agent. Each HE key manager is communicatively coupled to the management node and configured to fetch a public key of a given object in the KVS system to enable object key to public key mapping. Each homomorphic encryption and processing engine is communicatively coupled to the management node and configured to execute commands over the encrypted data without decrypting it. Each homomorphic memory store is communicatively coupled to the management node. Each hypervisor is communicatively coupled to the management node and configured to monitor performance of the management node in order to assess the quality of service of the management node. Each of the first, second, or third nodes serves on a rotating basis in a master node role, a secondary node role, or a back-up node role. The first, second, and third nodes rotate their roles when the master node's hypervisor detects a reduced quality of service of the master node's management node.

An embodiment of the KVS system described herein may be described in terms of a method comprising the following steps. The first step provides for hosting first, second, and third nodes respectively in first, second, and third cloud service providers. The next step provides for assigning the first node to serve as a master node, the second node to serve as a secondary node and the third node to serve as a back-up node. The next step provides for receiving, with the master node, encrypted data from a client-side agent. The next step provides for homomorphically processing, with the master node, the encrypted data without decrypting the encrypted data by executing commands over the encrypted data. The next step provides for storing the encrypted data in the master node. The next step provides for fetching, with the master node, a public key of a given object to enable object key to public key mapping. The next step provides for monitoring performance of the master node in order to assess the quality of service of the master node. The next step provides for taking the first node offline, reassigning the second node to serve as the master node, and reassigning the third node to serve as the secondary node in the event of a system failure or degradation of service in the first cloud service provider. The next step provides for bringing the first node back online to serve as the back-up node after the system failure or degradation of service no longer exists in the first cloud service provider.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
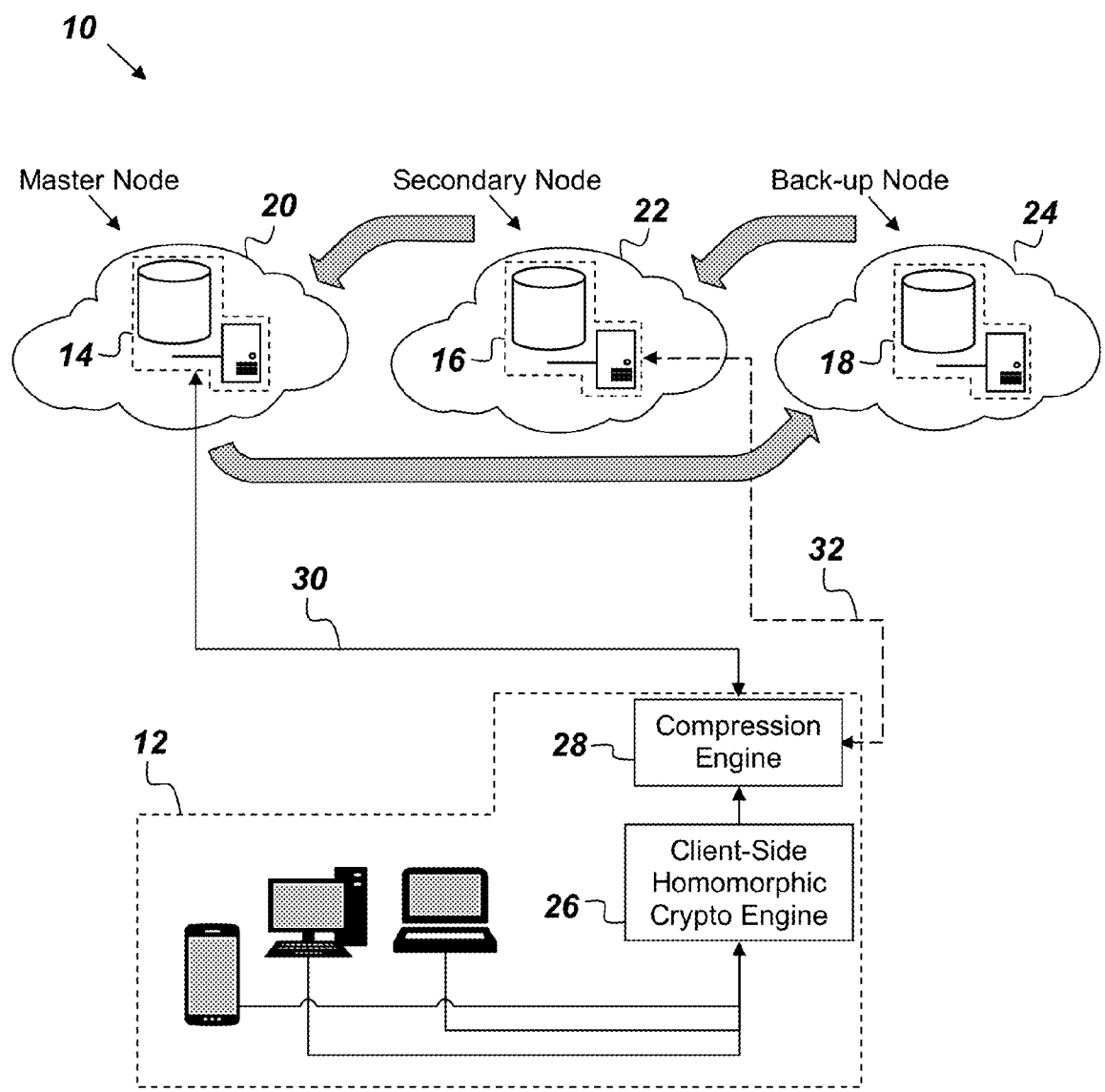
FIG. 1 is an illustration of an embodiment of a key value store.

FIG. 1 is an illustration of a key value storage (KVS) system 10 comprising, consisting of, or consisting essentially of a client-side agent 12 and first, second, and third nodes 14, 16, and 18 respectively. The client-side agent 12 is configured to encrypt data, and only the client-side agent 12 can decrypt the data. The first, second, and third nodes 14, 16, and 18 are hosted respectively in first, second, and third clouds 20, 22, and 24 provided by different cloud service providers. Each of the first, second, or third nodes 14, 16, and 18 serves on a rotating basis in a master node role, a secondary node role, or a back-up node role. In FIG. 1, the first node 14 is currently serving as the master node, the second node 16 as the secondary node, and the third node 18 as the back-up node. The first, second, and third nodes 14, 16, and 18 rotate their roles when a reduced quality of service is detected in the cloud service provider in which the master node is currently hosted. In this embodiment, the first, second, and third nodes 14, 16, and 18 would be hosted across different cloud service providers. The idea is that any time there are failures, service degradation issues, and/or data security issues within a given cloud service provider, the KVS system 10 is able to adapt and switch between different cloud providers.

The KVS system 10 may work with any number of cloud service providers. While it is possible for the KVS system 10 to operate with only two separate cloud service providers, it is recommended that there be at least three, though this parameter is also tunable. Due to the high-processing requirements inherent in homomorphic encryption, one may assume access to Xeon-class processors in the cloud. The homomorphic encryption engine could also be optimized to run on either General-purpose computing on graphics processing units (GPGPUs) or field-programmable gate arrays (FPGAs). FPGAs used in conjunction with Xeon-class processors would allow for co-optimization of workloads. This would be an example of such specialized high-compute workload. Storage requirements for the KVS system alone will depend on how much storage clients want in their data store. This is a provisioning problem and it is left to the cloud/data architects to decide. Suitable examples of cloud service providers include, but are not limited to, IBM®, Amazon®, Google®, Apple®, Cisco®, Citrix®, Joyent®, Microsoft®, and Rackspace®.

The thin client (or client-side) agent 12 may be any application capable of interfacing with the cloud service providers 20, 22, and 24. By way of example, the client-side agent 12 may be hosted on many different types of clients including, but not limited to, desktop computers, laptops, personal electronic devices such as tablets, mobile phones, wearable computers, and of course, Internet-of-Things devices. Regarding data security, one may assume that the cloud service providers are not to be trusted, so data should not be in plain text at any given time (e.g., even in-memory while being encrypted/decrypted). This means that the only entity with access to the private key information needed to decrypt data is the client, the owner of the data being stored in the cloud. The client-side agent 12 may comprise a homomorphic crypto engine 26, such as is displayed in FIG. 1. In the event a given client is not strong enough to perform homomorphic computations, the KVS system 10 can deploy the client-side agent 12 as a proxy-like service. The idea is that this proxy-like service would have to either be hosted at a client's facility (e.g., private cloud or datacenter), or a trusted third party, otherwise, it would defeat the purpose of performing homomorphic operations over data that may be exposed at the untrusted party's end. The client-side agent 12 may perform compression of any information sent to the cloud service. This is an optional step and not necessary for the KVS system 10 to work. Thus, the client side agent 12 may comprise an optional compression engine 28, which primarily looks at minimizing the necessary amount of bandwidth needed to transfer data between the client agent and the master server node.

The master node, or master server node, is the main point of entry to the KVS system 10. Basically, the master node is the main point of communication in a 3+ node cluster configuration. The master node serves as the primary communications link with the client-side agent 12, as indicated by the solid line 30. In a proxy-like configuration, the master node may reside at the trusted proxy side. The master server node may run on a physical machine or a virtual machine at a data center. In the event that quality-of-service (QoS) degrades beyond a certain threshold or a system failure is detected, the master node will start a switch-over process, which will migrate all future transactions to the secondary node. The updated primary communication link with the client-side agent 12 is indicated by the dotted line 32 in FIG. 1. Switch-over may occur in two steps: a) Notify all client agents registered with the master node that the secondary node will be the new gateway (e.g., advertise the new IP address and port), and b) Make sure to complete execution of all queued client requests (including forwarding the requests to the secondary node). Once the switch-over is complete, the given node currently serving as the master node will take itself off the list of available nodes in the KVS system 10 until the given node's QoS is back to normal. Once the given node (former master node) is back to a normal state, it will re-enlist into the KVS system 10 as a backup node. The KVS system 10 may employ a round robin scheme to alternate between master and secondary/backup nodes, such as is shown by the large arrows in FIG. 1.

The secondary server node serves as a backup to the primary master node. This means that in the event of a failure at the master node, the secondary server node takes over operations. The secondary node is in sync with the master node. The KVS system 10 may run a mirroring service at each node, which keeps a mirror at an alternate location. FIG. 1 shows a 3-node configuration of the KVS system 10 where the master node mirrors itself to the secondary node asynchronously, and the secondary node mirrors itself to the backup node asynchronously. Mirroring happens by forwarding storage altering requests from clients to the other nodes (e.g., writes/updates, homomorphic computations, etc.).

The backup server node serves as a mirror of the secondary node. The idea is that in this embodiment of the KVS system 10, there is a node available to take over the master node role in the event the secondary node fails before the initial master node is able to come back online and re-join the cluster of available nodes. This is used to provide a higher-degree of assurance. The backup server node becomes a secondary server node upon re-entry of the master node into the cluster. The master server node then becomes a backup node to the secondary node. This provides an opportunity for the master node to go down again in the event it has not fully recovered.

Figure 2:
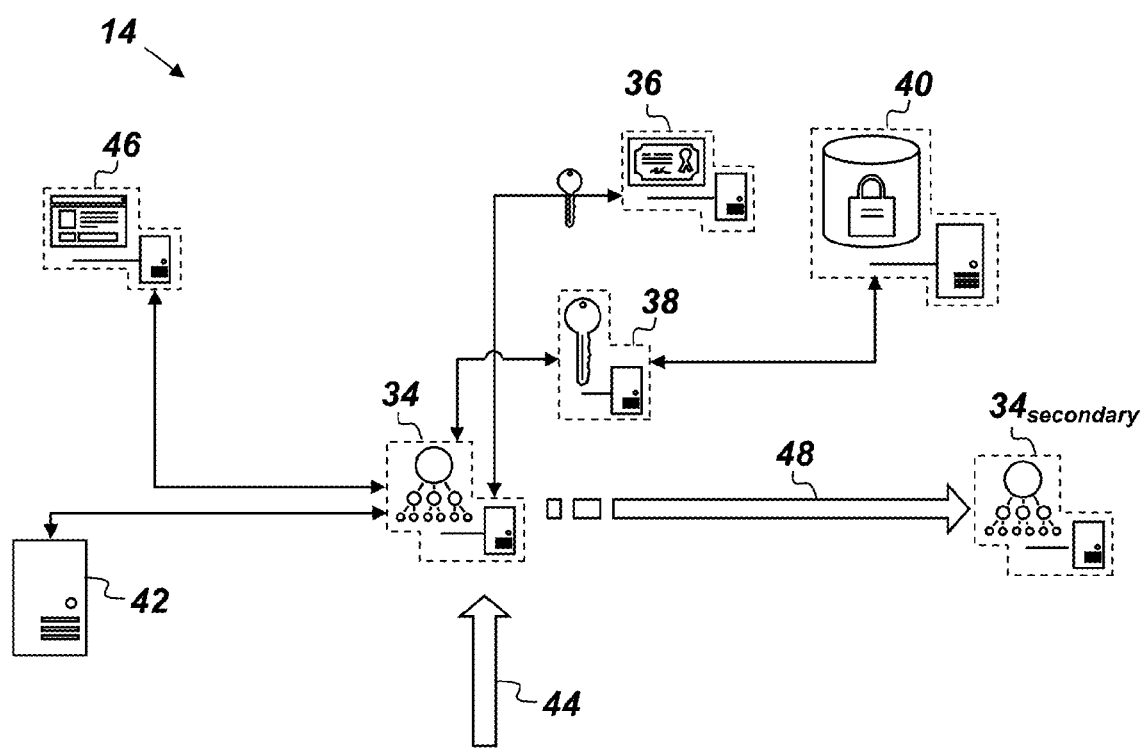
FIG. 2 is an illustration of an embodiment of a server node.

FIG. 2 is an illustration of node 14. Although node 14 is depicted in FIG. 2, it is to be understood that it is representative of each server node in the KVS system 10. As shown in FIG. 2, each server node comprises, consists of, or consists essentially of: a management node 34, a homomorphic encryption (HE) key manager 36, a homomorphic encryption and processing engine 38, a homomorphic memory store 40, and a hypervisor 42. Each management node 34 is configured to receive encrypted data 44 from the client-side agent 12. Each HE key manager 36 is communicatively coupled to the management node 34 and is configured to fetch a public key of a given object in the KVS system 10 to enable object key to public key mapping. Each homomorphic encryption and processing engine 38 is communicatively coupled to the management node 34 and is configured to execute commands over the encrypted data 44 without decrypting it. Each homomorphic memory store 40 is communicatively coupled to the management node 34. Each hypervisor 42 is communicatively coupled to the management node 34 and is configured to monitor performance of the management node 34 in order to assess the quality of service of the management node 34. The first, second, and third nodes 14, 16, and 18 rotate their roles when the master node's hypervisor 42 detects a reduced quality of service of the master node's management node 34.

The hypervisor 42 serves as a quality-of service monitor, which monitors the state of the KVS system 10. The idea is to tap into low-level services, such as xentop, to be able to analyze different system metrics such as CPU, Disk, Memory, Network utilizations. For example, the monitoring service may run natively as a part of a Xen Hypervisor. This monitoring service is responsible for triggering requests for service migration/switch-over. A hypervisor abstracts the physical characteristics of a piece of hardware, and presents an abstracted, virtualized set of resources (virtual CPUs, virtual memory, virtual disk, virtual network interfaces, etc.), to each virtual machine. Each virtual machine then thinks it is running on top of dedicated hardware. Suitable hypervisors that may be used as the hypervisor 42 include, but are not limited to, ESXi by VMWare®, a Xen Project® Hypervisor, a Kernel-based Virtual Machine (KVM), and Microsoft's Hyper-V®.

The hypervisor 42, functioning as the QoS monitor, may leverage machine learning to differentiate between good and bad/poor quality of service. The QoS monitor may be configured to learn resource utilization patterns and responsiveness of the different virtual machines that host nodes and components. In one embodiment, the hypervisor 42 may infer that a given cloud service provider 20 is experiencing an outage based on a long timeout (e.g., if a cloud service is unreachable within a given time window t, then it is deemed as a down cloud service). The management node 34 is responsible for two things: a) Parsing requests from clients and redirecting to the appropriate module, and b) forwarding write/update/homomorphic processing requests to the management node 34 of the secondary server node.

Still referring to FIG. 2, each server node may comprise an optional decompression/compression engine 46, which may be used to compress/decompress data 44 coming from the different agents 12. The KVS system 10 may use the decompression/compression engine 46 to minimize the amount of data 44 transferred between agents and server nodes, as well as the data mirrored among server nodes (e.g., master to backup). Note, the KVS system 10 allows for tradeoff analysis between different types of compression algorithms. Moreover, the KVS system 10 may be configured to do two types of compressions: a) data-in-transit compression as well as data-at-rest compression.

The HE processing engine 38 is the main component of each server node as it has the ability to homomorphically encrypt/decrypt, as well as process data without decrypting it. The HE processing engine 38 also performs data integrity checks homomorphically to validate data when read from disk. The HE processing engine 38 has a built-in assembly-like programming language that allows the HE processing engine to run basic programs on the encrypted data 44. This means that the KVS system 10 can upload the encrypted data 44 as well as the processing logic (in the form of assembly) onto the server node, which may execute the program homomorphically.

The HE key manager may be used to fetch the public key of the given object stored in the KVS system 10. This allows the KVS system 10 to do the object key to public key mapping needed to homomorphically process the data 44. The HE memory store 40 is the main storage component of each server node consisting of nothing but raw storage space. During the transaction mirroring process, represented by large arrow 48 in FIG. 2, the basic queue of requests coming from the client are forwarded to the secondary server node. On a switchover event, the master node verifies that this queue is empty and performs blocking IO so that the queue is fully processed prior to going offline.

Figure 3:
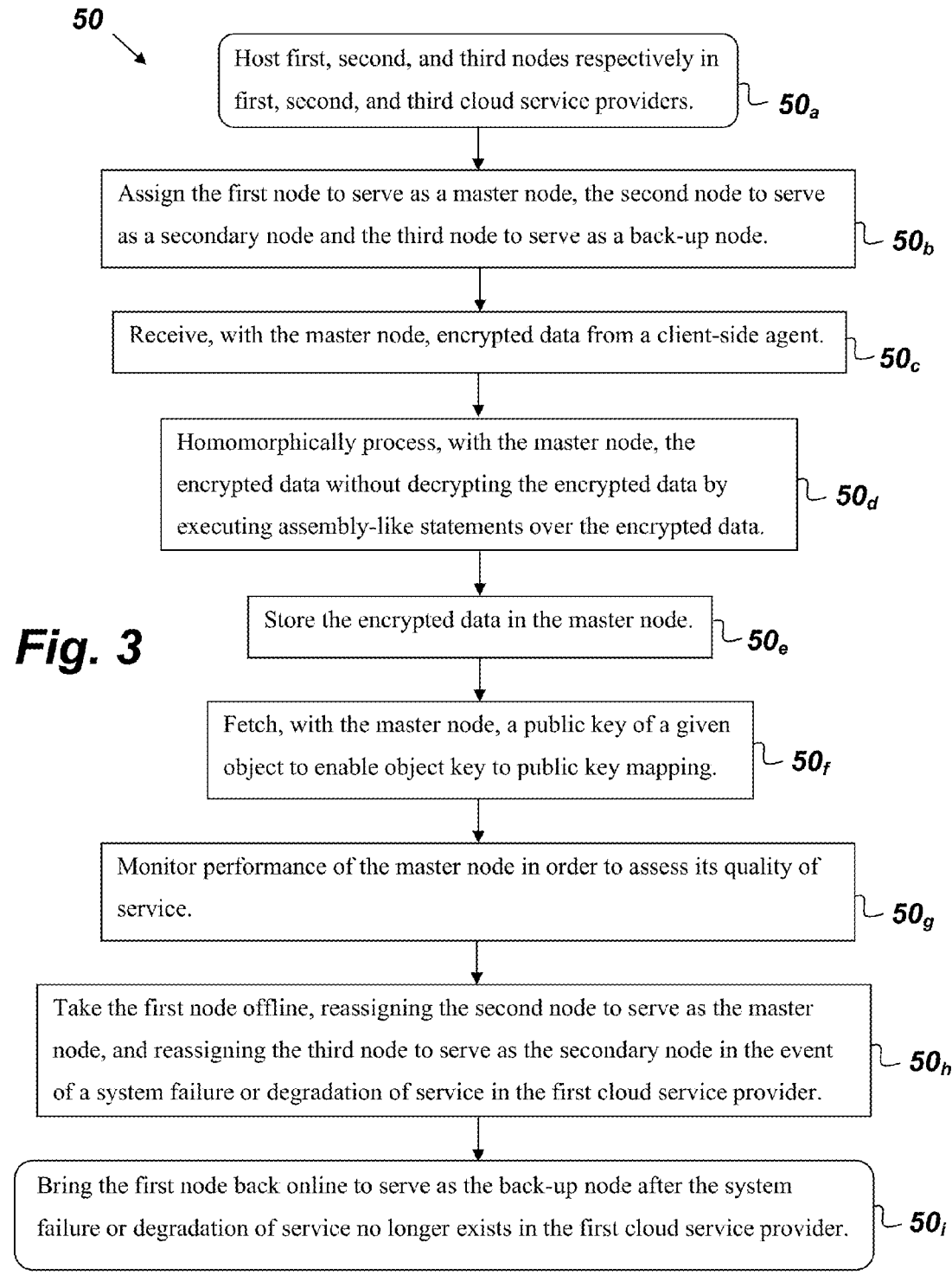
FIG. 3 is a flowchart of a key value store method.

FIG. 3 is a flowchart illustrating the steps of a method 50 that corresponds to the embodiment of the KVS system 10 shown in FIGS. 1 and 2. The first step $50_a$ provides for hosting the first, second, and third nodes 14, 16, and 18 respectively in first, second, and third cloud service providers 20, 22, and 24. The next step $50_b$ provides for assigning the first node 14 to serve as the master node, the second node 16 to serve as a secondary node and the third node 18 to serve as a back-up node. The next step $50_c$ provides for receiving, with the master node, encrypted data 44 from the client-side agent 12. The next step $50_d$ provides for homomorphically processing, with the master node, the encrypted data without decrypting the encrypted data by executing commands over the encrypted data 44. The next step $50_e$ provides for storing the encrypted data 44 in the master node. The next step $50_f$ provides for fetching, with the master node, a public key of a given object to enable object key to public key mapping. The next step $50_g$ provides for monitoring performance of the master node in order to assess its quality of service (e.g., transactions per second). The next step $50_h$ provides for taking the first node 14 offline, reassigning the second node 16 to serve as the master node, and reassigning the third node 18 to serve as the secondary node in the event of a system failure or degradation of service in the first cloud service provider 20. The next step 50$_t$ provides for bringing the first node 14 back online to serve as the back-up node after the system failure or degradation of service no longer exists in the first cloud service provider 20.

Figure 4:
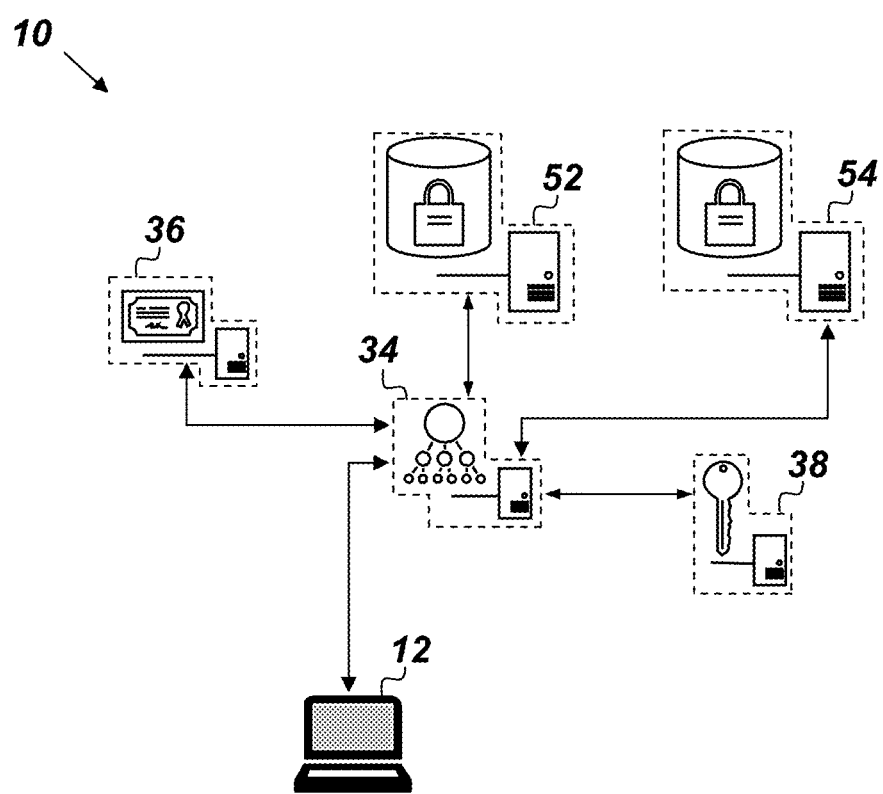
FIG. 4 is a diagram of embodiments of components of a key value store.

FIG. 4 is a diagram depicting a prototype embodiment of a master node and client-side agent 12 of the KVS system 10. The client-side agent 12 was implemented in C++ and was hosted on a HP EliteBook 8570 laptop. In this embodiment, the client-side agent 12 performed the following: public/private key generation, encryption/decryption, and cipher and pubkey compression. The master node components in this embodiment ran as virtual machines hosted on a z420 HP work station and performed the following operations while all the data remained encrypted: HE addition, HE subtraction, HE multiplication, HE inversion for boolean/binary arithmetic, and real-time compression. For the prototype embodiment of the KVS system 10, programming language macros were added to IBM's HELib (homomorphic encryption library) to enable processing of data. The prototype embodiment of the KVS system 10 was based off Google®'s LevelDB, which is written by the same group that built Google's BigTable®. The client-server API was built using the Apache® Thrift Framework, which allows multi-language APIs. The KVS system 10 is capable of pushing data as well as programming logic from a thin client to a server, and is able to process the data (execute the programming logic) homomorphically. The prototype embodiment of the KVS system 10 allows for 8-bit and 16-bit operations; the KVS system 10 also supports 32-bit operations but the processing required is quite high. This embodiment of the KVS system 10 included a public key store 52 and a cipher key store 54, both of which were communicatively coupled to the management node 34.

The following is a an example of an HE assembly program that was executed by the HE processing engine 38 of the prototype embodiment of the KVS system 10:

Load Reg1 key1
Load Reg2 key2
Load Reg1 key3
Add Reg1 Reg2 # Reg1=Reg1+Reg2
Mul Reg1 Reg3 # Reg1=Reg1*Reg3
Store Reg1 key1

In addition to simple queries, the KVS system 10 understands assembly-like statements, or commands. The KVS system 10 can execute such command over encrypted data thus making a fully homomorphic storage system possible. For example, all operations may be performed by the KVS system 10 without converting encrypted data to plain text. An embodiment of the KVS system 10 may be configured to distribute storage across different servers, these can be hosted within a cloud, within a data center, or within a small lab configuration.

The KVS system 10 may be used to implement a secure proxy scheme (e.g., secure storage service). In this embodiment, the KVS system 10 would need a secure proxy node and at least three extra storage nodes, thus removing any need to execute computation intensive tasks from the client 12. This model would require the hosting of the secure storage service in a trusted network that would perform the encryption of the data and storage of the private key information, while the data, public keys, and homomorphic operations are carried out in an untrusted network.

The management node 34 serves as the master node or point of entry (gate-way) to the KVS system 10. In this prototype embodiment, the management node 34 depends on the Thrift framework for communication with the client. Essentially, the management node 34 handles requests from clients and orchestrates the different operations supported by the KVS system 10. The HE key manager 36 is responsible for generating, storing, and fetching keys from the public key store 52. The public key store 52 holds public keys associated with each client connected to the system. When a client registers with the system, it pushes its public key to the management node 34, which then generates a unique ID for the client. This is used as the key component for the public key store 52. Similarly, the prototype embodiment of the KVS system 10 depicted in FIG. 4 also keeps the cipher store 54, which contains the cipher texts being pushed to the KVS system 10. As mentioned above, the prototyped embodiment of the KVS system 10 uses Google®'s LevelDB as the back-end storage component, however, one having ordinary skill in the art can easily migrate to other systems such as the NoSQL system Apache® Accumulo.

Figure 5:
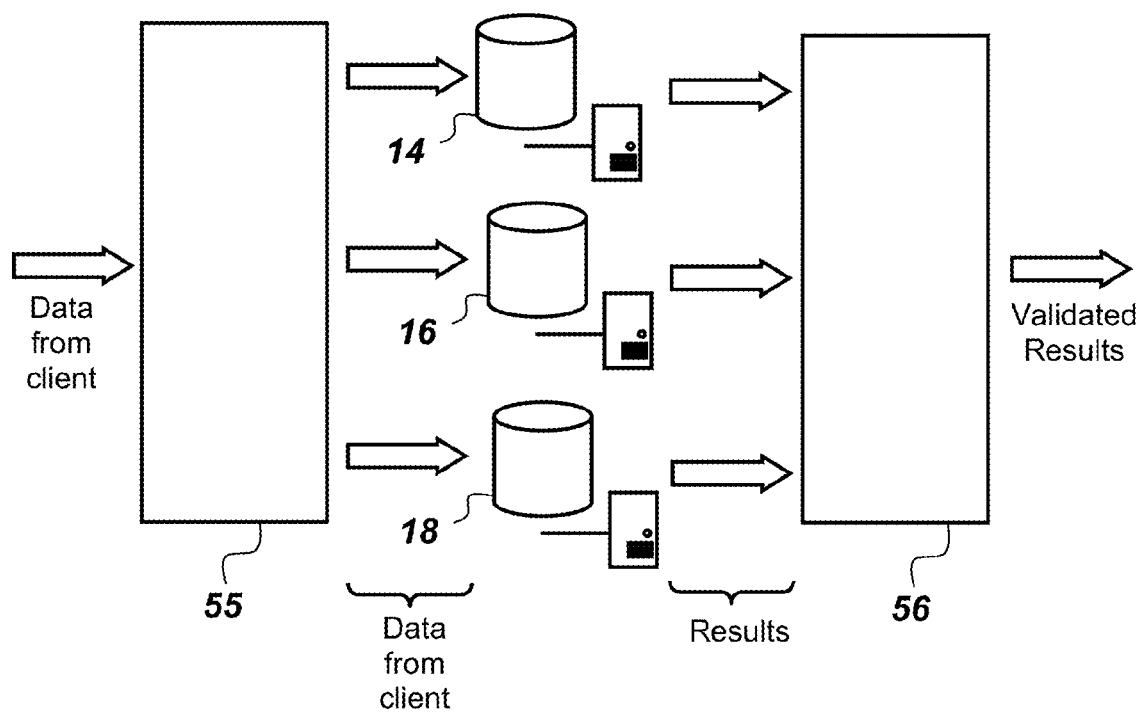
FIG. 5 is an illustration of an embodiment of a key value store.

FIG. 5 shows a high-assurance computation embodiment of the KVS system 10. In this embodiment, data from the client 12 is received by a data distributor 55. The management node 34 may serve as the data distributor 55. The data distributor 55 then distributes the data to three separate compute nodes 14, 16, and 18 that carry on homomorphic computation of the encrypted data. This embodiment also comprises a homomorphic result aggregator 56 that is configured to perform a majority-voting check to validate the results of the nodes 14, 16, and 18. This embodiment may be used to validate the computation results even in the event one of the nodes 14, 16, or 18 has been compromised by an attacker. An embodiment of the KVS system 10 may be implemented on a set of small z420 HP work stations or HP 8760w mobile workstations and deployed on a small scale in the field, or implemented on high-end Dell PowerEdge servers and deployed in a data center.

Figure 6:
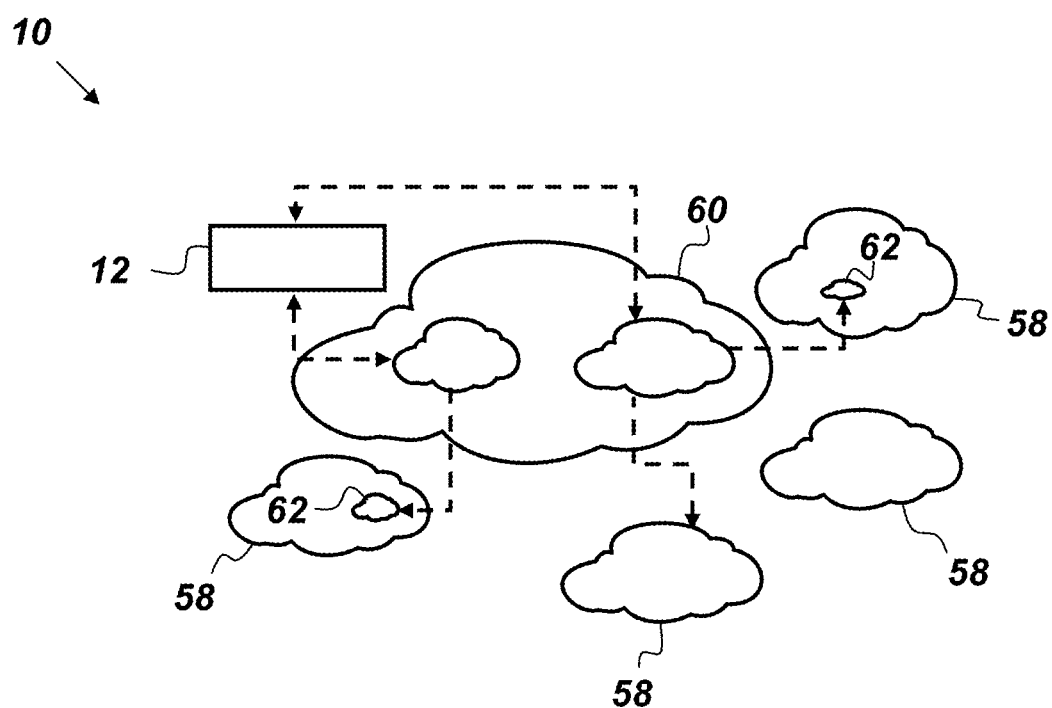
FIG. 6 is an illustration of a high-level concept behind an embodiment of a key value store.

FIG. 6 shows a high-level diagram of the concept behind the KVS system 10. Essentially, the KVS system 10 enables small migratory cloud services to move between different cloud service providers on demand while preserving data privacy. FIG. 6 shows several host cloud providers 58 and a virtual cloud service 60. The KVS system 10 may leverage public/hybrid cloud infrastructure, such as the host cloud providers 58, to build cloudlets 62 that are capable of moving between different host cloud service providers 58. Different cloud providers 58 allow for migration of different virtual machine types regardless of the hypervisor running Migration of a virtual machine from a Xen-based to a KVM-based or a VMWare-based system may not be feasible, but by leveraging hypervisor-agnostic virtual environments one can perform live migration between clouds with little overhead.

The monitoring system (i.e., hypervisor 42) may run in a separate network from the virtual infrastructure, or in one embodiment, the monitor may only send migration commands to the hypervisors 42 in a data center without any interaction from outside of the network. One may use a load balancer and session manager in order to maintain the session between the source and the destination host during migration.

The KVS system 10 may comprise an anomaly detection engine that is based on side-channel monitoring and analysis, and attempts to detect potential cyber-attacks or degradations in QoS. In order to determine whether a virtual machine is under attack, the KVS system 10 can deploy different systems that complement the anomaly detection engine. Such systems can be host-based intrusion detection, log-based analysis, or more invasive systems that may affect each virtual machine's performance. In the event of an anomaly, the KVS system 10 may trigger migration to isolate the virtual machines under attack. The KVS system 10 may be configured to send the virtual machine under suspicion to a honeypot. The anomaly detection system may be considered to be an early warning system.

One way in which the KVS system 10 monitors and analyzes the behavior of each virtual machine, is by extracting their side-channels. Side-channels are bits and pieces of information leaked by a given system (e.g. CPU utilization, memory usage, network I/O, and disk I/O). Each virtual machine may leak metrics that can be extracted unknowingly from the hypervisor. This may be achieved in one embodiment by extending the Xen software stack. In particular, the xenstat component within xen tools (xen-4.3.0-rc2/tools/xenstat). The xentop utility allows one to capture per-virtual machine information. The xentop utility may be extended to extract all the information needed for the anomaly detection engine described above.

The anomaly detection engine, or behavior analysis engine, may be written in Python with Apache's® Thrift Framework installed on the monitor virtual machine and on the monitored hypervisor. A single monitor may be used per hypervisor or a single monitor may be used for multiple hypervisors. Cloud environments consist of thousands, if not hundreds of thousands, of hypervisors.

Figure 7A:
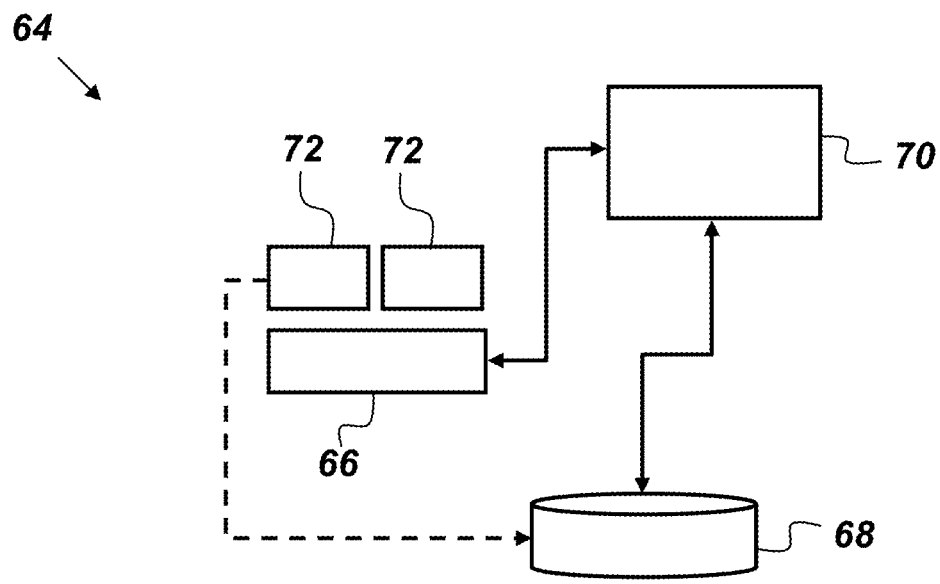
FIG. 7A shows an embodiment architecture of a system monitor.

FIG. 7A shows an embodiment architecture of a system monitor 64. The system monitor 64 comprises a hypervisor 66 that is to be monitored, a database 68, and a monitor engine 70. In this embodiment, the hypervisor 66 runs the customized Xen tools software stack (e.g., xentop) described above on Apache's® Thrift Framework with Python™ installed. The hypervisor 66 also has a management agent that listens to commands coming from the monitor engine 70. In this embodiment, we define a schema to keep track of each domain's run-time metrics and store them in our database 68. The custom Xen software stack pushes metrics on a per virtual machine basis at a fixed rate. The default interval rate in this embodiment is 30 seconds, but it can be increased or decreased. The monitor engine 70 is responsible for monitoring the behavior of each virtual machine 72 running on the hypervisor 66. At every time interval t, the monitor engine 70 may be configured to wake up, fetch k data samples for the current time (e.g., using time of day for instance), and may use these samples to predict normal behavior and compare it with measured metrics of the hypervisor 66 (e.g., CPU utilization). When anomalous behavior or QoS degradation is detected, the monitor engine 70 then may be configured to send a migration request to the monitored hypervisor 66. The monitor engine 70 in this embodiment is based on the programming language ML.

Figure 7B:
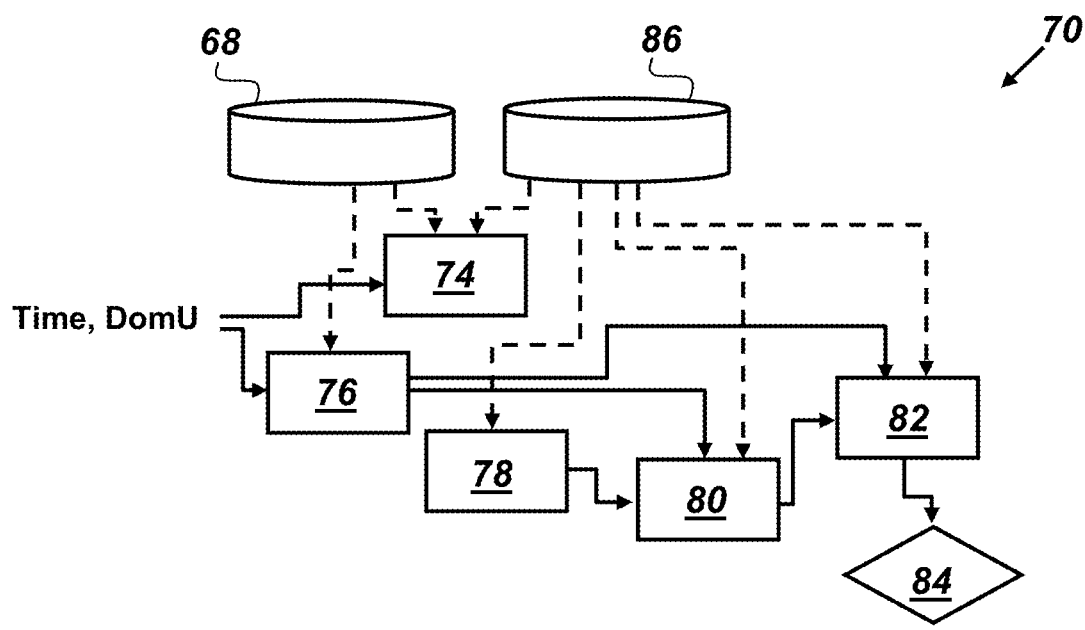
FIG. 7B shows a block diagram of an embodiment of a monitoring engine.

FIG. 7B shows a block diagram of the monitoring engine 70 shown in the embodiment of the system monitor 64 shown in FIG. 7A. In this embodiment, the monitoring engine 70 is written in Python™ and uses the MySQL® Python™ connector and the Thrift framework. The monitoring engine 70 includes a monitoring agent residing on the monitored hypervisor 66, shown in FIG. 7A. As shown in FIG. 7B, the monitoring engine 70 comprises a training data set block 74, a current stats block 76, a train block 78, a predict estimated block 80, a migrate decision block 84, and a DomU (domain/virtual machine, where U can be an index referring to the specific virtual machine) Rule Sets database 86. The following in an example embodiment of an anomaly detection algorithm (hereinafter referred to as Algorithm 1) that may be run on the system monitor 64.

1: $dom_{id} \leftarrow DOMU.id$
2: $start \leftarrow dateTimeRange_{start}$
3: $end \leftarrow dateTimeRange_{end}$
4: $k \leftarrow sampleCount$
5: $frequency \leftarrow DAILY$
6: $features_{list} = getKSamples(dom_{id}, start, end, k, frequency)$
7: $measuredSamples = getMeasuredSamples(dom_{id}, getCurrentTimeStamp(\ ))$
8: $features_{matrix} = buildFeaturesMatrix(features_{list})$
9: $features_{predicted} = bayesPredictor(features_{matrix}, features_{list}, measuredSamples)$
10: $thresholds \leftarrow POLICY\ [dom_{id}].thresholds$
11: $anomalies_{list} = detectAnomalies(features_{predicted}, measuredSamples, thresholds)$
12: $triggerMigration(anomalies_{list}, dom_{id}, start, end)$ The algorithm above shows an example of pseudocode for the monitoring engine 70. The date/time ranges can be affixed to well-known/golden reference time windows that show normal behavior for a given virtual machine. The sample count shows the number of data points to be used for the training sets. The frequency is part of the policy and is configurable. For instance, one can do daily monitoring, where one has golden reference models for each day (on a daily, weekly, monthly, or yearly basis). The frequency will determine how often a system will be under observation, and the size of the monitoring database. The frequency can also vary depending on how often a hypervisor pushes data to the system—the default may be set to 30 seconds. This embodiment of the system monitor 64 builds feature matrices from four separate side-channel metrics: CPU utilization, memory utilization, network utilization, and time of day. One may use a total of k samples (e.g., four days of data) to generate a prediction model, which can then be used to compare to the currently measured data (e.g., predict using the results of the past 100 data points, or 3000 seconds). The policy component is responsible for managing the threshold data. Since this threshold data is system/environment-dependent, it may be tuned by a system administrator. By setting the threshold in the policy, the system administrator indicates when a migration should be triggered. Using the migration policy, the system monitor 64 is able to monitor virtual machines and trigger their migration. One policy may require virtual machines with anomalous behavior to be migrated to a honeypot. Another policy may migrate critical virtual machines out of the hosting hypervisor to prevent any possible service disruption.

Figure 8A:
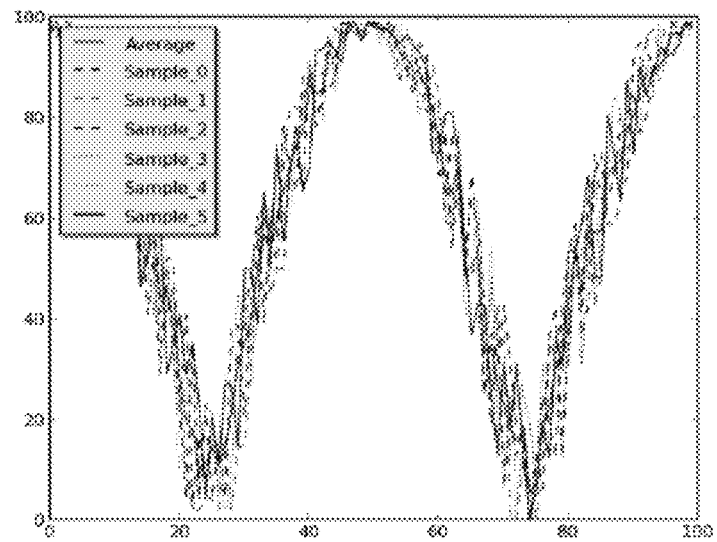
FIGS. 8A-8B are graphical plots illustrating performance of an embodiment of a monitor engine.
Figure 8B:
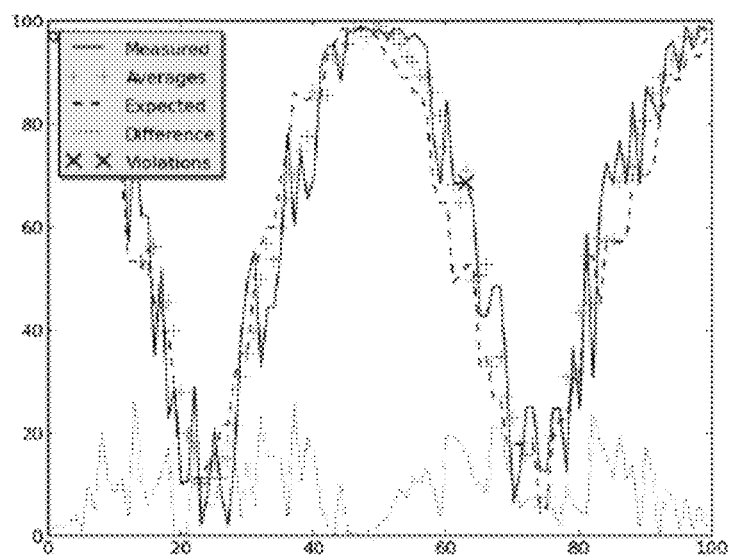

FIGS. 8A-8B are plots showing the monitor engine 70's ability to predict and find anomalies in a given feature set. FIG. 8A shows the moving average of a total of five different historical data samples plus the current data set (i.e., Sample_0). FIG. 8B shows four lines: 1) Measured, which represents the current data set (e.g., current CPU utilization), represented in FIG. 8B as a solid trace; 2) the moving average, represented in FIG. 8B by the + signs; 3) the expected utilization obtained by running the different datasets through the monitor engine 70, represented in FIG. 8B by the dashed line; and 4) a line representing violations, represented by the X signs in FIG. 8B. Essentially, one can feed the monitor engine 70 k=5 data sets, and build a set of features for the learning phase, which may leverage a Naive-Bayes model. The current data set may then be used as the testing set and one can generate a prediction model, which may be used as the expected baseline. Using the expected results (dashed line in FIG. 8B), one can compare it with the current measured data set (solid line in FIG. 8B), and generate an anomaly/difference data set (represented by the dotted line in FIG. 8B) that is then sent to monitor engine 70.

The monitor engine 70 then uses policies to determine whether there are violations or not. For example, a very simple policy would use a combination of thresholds and sequences to define a violation. In this example, the policy was set as follows: violation:threshold=15%; sequence=2. This means that a violation occurs if two or more consecutive points exceed the 15% difference/variation threshold, or in other words, if two consecutive CPU utilization measurements (current) exceed the 15% deviation threshold from the predicted/expected utilization. The Naive Bayes classifier used in the above embodiment is just an example, one may use neural networks to identify violations assuming one can generate enough data sets for training the neural networks. The monitor engine 70 is able to detect possible anomalies. Depending on the policy specified by the system administrator, the suspected virtual machine may be migrated to a honeypot environment for further and more invasive analysis, or mission critical services (virtual machines) being hosted on the same hypervisor as the suspected virtual machine may be migrated to a separate hypervisor/datacenter. Monitoring utilizations on a per-VM basis are metrics that are essentially side-channels, information each system leaks, and their measurement is non-intrusive, thus, the monitor engine 70 has no effect on the monitored virtual machines.

Referring back to FIG. 4, the client-side agent 12, which is responsible for generating its key pair, encrypting and decrypting data. The management node 34 runs a server-side daemon that listens for client requests. The server is for providing different services such as distribute data, push data, get data, call on the homomorphic processing engine to compute over encrypted data, etc.

The client-side agent 12 may be installed on a trusted node. This trusted node is responsible for encrypting data, and has access to data in plaintext. For example, a C++ client that can be extended to do various things, from simple tests to more complex tasks. The following is an example data processing algorithm (hereinafter referred to as algorithm 2) that may run on the KVS system 10:

1: KVS_SYSTEM_parser cfg(config_file)
2: KVS_SYSTEM_server←Thrift_KVS_SYSTEM_Server.init(cfg) {Generate Thrift server instance}
3: <pk, sk←FHELib.generateKeyPair(cfg)
4: KVS_SYSTEM_server.registerPubKey(pk) {Must push the public key to the server}
5: $data_{encrypted}$←FHELib.encrypt(pk, $data_{plaintext}$)
6: $data_{kvs}$←Client.KVSKeyGen($data_{plaintext}$) {Generate a unique key for this item for storage. The key generation is up to the developers as it is common in KVS systems. It can be HE encrypted as well, or protected by any other mechanism.}
7: KVS_SYSTEM_server.push($data_{kvs}$, $data_{encrypted}$) {Encrypt and push encrypted data to the server}
8: operation $Op^{immediate}$
9: $Op_{kvs}^{immediate}$←$data_{kvs}$
10: $Op_{operand}^{immediate}$←'+'
11: $Op_{val}^{immediate}$←2
12: KVS_SYSTEM_server.process($Op^{immediate}$) {Generate processing command, and send it to the server.}
13: $data2_{encrypted}$←KVS_SYSTEM_server.get($data_{kvs}$)
14: $data2_{decrypted}$ FHELib.decrypt(sk, $data2_{encrypted}$) {Fetch data from the server using the unique kvs key, then decrypt it using the secret key (sk).}
15: assert($data_{plaintext}$+2==$data2_{decrypted}$) {Verify data+2==(decrypt(encrypt(pk,data)+2),sk)}

The HE processing engine 38 is responsible for carrying out computations on the encrypted data 44 on behalf of the client. Algorithm 2 shows pseudocode depicting the necessary steps needed to push data to the KVS system 10 for processing and retrieval. Essentially, one can initialize the client and generate the public/private key pair (pk, sk). Note, in a deployment environment, key generation must be done by a trusted third party, as it is done with current key management infrastructures. Alternatively, one could try to do homomorphic encryption based key management/distribution. The next step is getting the data one wishes to homomorphically process—in this example one has $data_{plaintext}$. One then gets the encrypted data 44 ($data_{encrypted}$) by asking the client's homomorphic encryption engine to encrypt the $data_{plaintext}$ using the public key pk. In this embodiment, one will also need to generate the object-specific KVS key needed to access the data element. Note that, in this embodiment, this is a NoSQL system, thus, as an object store, items are accessed via keys, whose definition is left to the clients. In the prototype embodiment, one can simply compute a unique hash of the data plus a timestamp ($data_{kvs}$=Client.KVSKeyGen($data_{plaintext}$)).

Once one has the key and encrypted data pairs, they may be pushed to the cloud service by sending a push request to the management node 34 (KVS_SYSTEM_server.push($data_{kvs}$, $data_{encrypted}$)). Next, one can create a compute command/operation (or compute circuit) that will be carried out by the KVS system 10. This command is then pushed to the server, which will execute the circuit over the encrypted data 44. To accomplish this, an operation object $Op^{immediate}$ is created, which takes in the data's KVS key ($data_{kvs}$), the operand (+), and an immediate value (val=2). Note that one can also pass in an address to another data object in the form of a KVS key ($data_{kvs}$). The KVS system 10 also supports assembly-like programs that are parsed and executed at the server side. One can push data elements to the cloud, along with a computation circuit or an assembly program, which then gets homomorphically computed. After the computation parameters have been set, one can push them and execute them at the server side (KVS_SYSTEM_server.process($Op^{immediate}$)). The management node 34 will then query the HE Key Manager 36 for the necessary public keys, and send the data to the HE Processing Engine 38. At the end of the process, sanity checks may be carried out to make sure that the encrypted data that is sent back from the server matches the expected value, to validate that the operation is indeed what was expected (assert($data_{plaintext}$+ 2==$data^2_{decrypted}$).

Figure 9A:
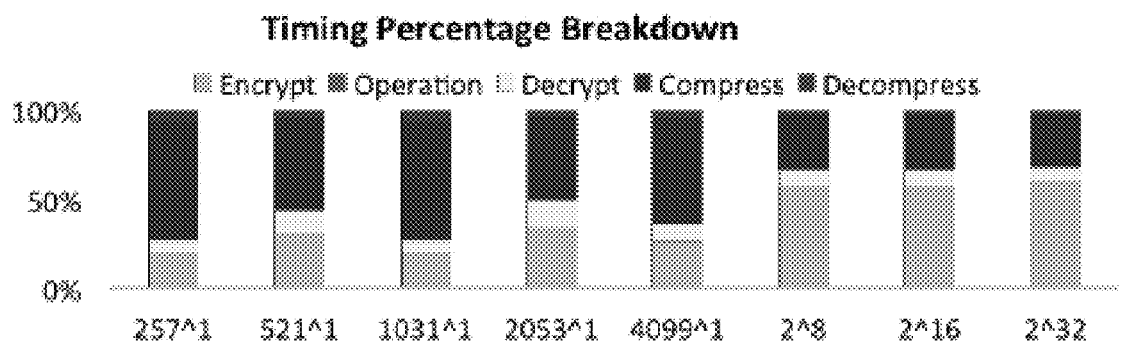
FIG. 9A is graph showing a breakdown of different components that make up execution time on an embodiment of a key value store.

FIG. 9A shows a breakdown of the different components that make up execution time on the KVS system 10. From FIG. 9A, one can see that compression and encryption are the two main contributors to the execution times. As one increases the plaintext size, encryption starts to dominate the execution time. The prototype embodiment of the KVS system 10 utilized a real-time compression engine that leveraged the Lempel-Ziv-Markov chain algorithm (LZMA), which is an algorithm used to perform lossless data compression, which gives one of the highest compression ratios, but tends to be slow. As a result, one option to improve the performance of the KVS system 10 would be to remove compression altogether at the cost of increasing the storage requirements for the KVS.

Figure 9B:
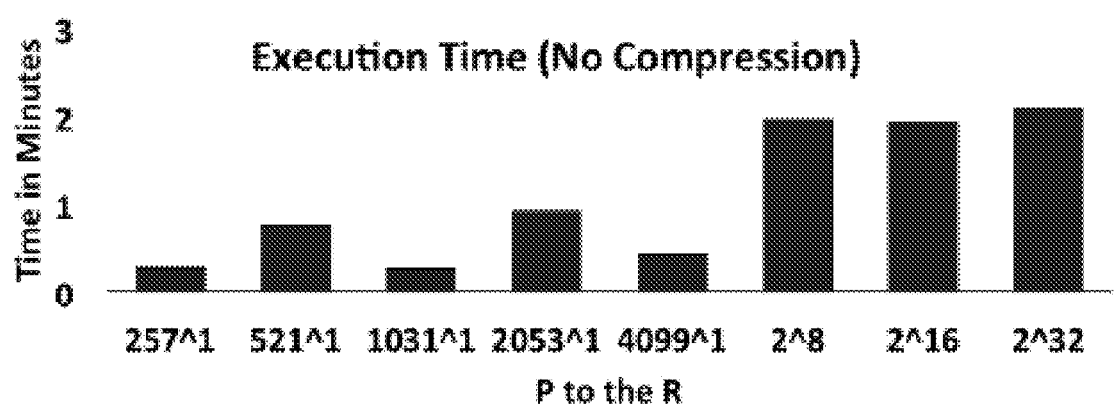
FIG. 9B is a graph showing execution time without compression of an embodiment of a key value store.

FIG. 9B is a graph showing execution time without compression. From FIG. 9B, one can observe that total processing time can go down significantly, from 1.04 minutes to 0.27 minutes for the [p=2; r=8] case and from 2.98 minutes down to 1.97 minutes for the [p=2; r=8] case. These results are significant in terms of system performance. However, one drawback is that bandwidth and storage requirements for uncompressed data may be much larger than necessary. Therefore, a balance should be found between compression ratio and performance, which requires a tradeoff analysis. The KVS system 10 has built-in functionality to allow for various levels of compression.

Figure 10A:
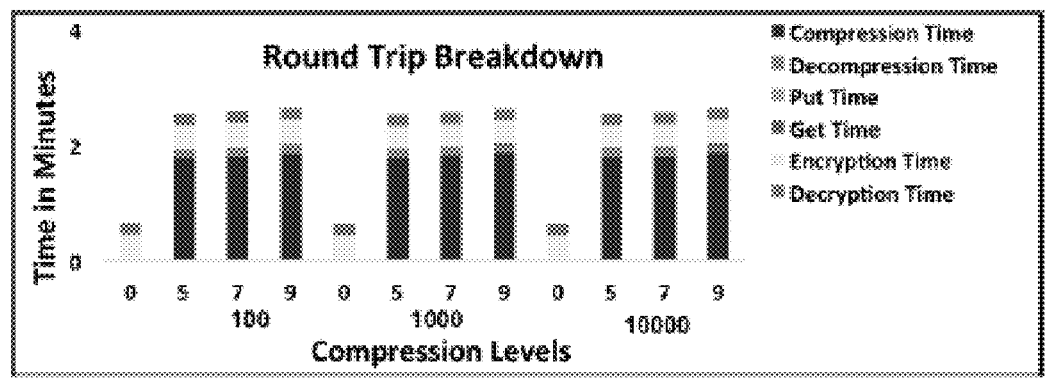
FIG. 10A shows a plot of different compression levels across different numbers of records being stored in a database.
Figure 10B:
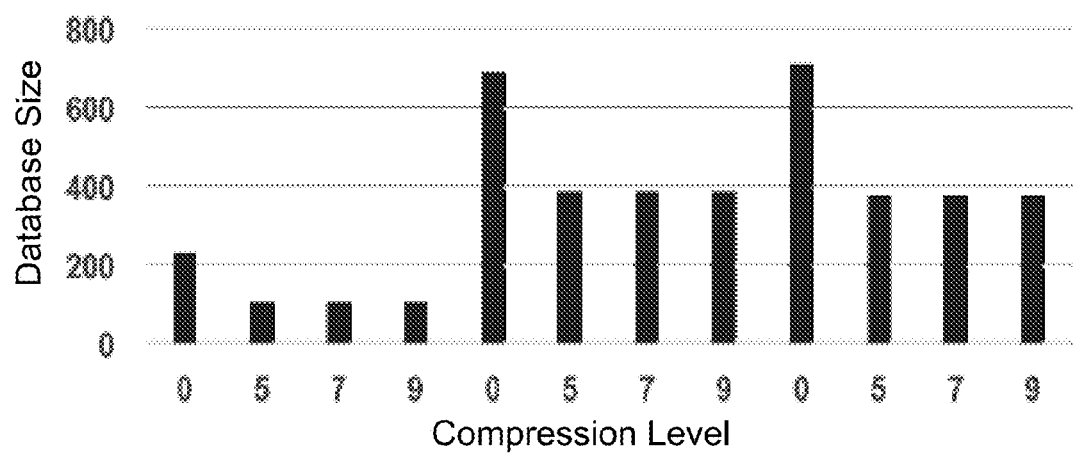
FIG. 10B is a plot comparing database size at various compression levels.

FIG. 10A shows a further breakdown of different compression levels across different numbers of records being stored in the database. As one can see, no compression yields the best performance, and going beyond a compression level five gives only a marginal improvement in the compression ratio, as can be seen in FIG. 10B, which is a plot comparing database size at various compression levels.

Figure 11A:
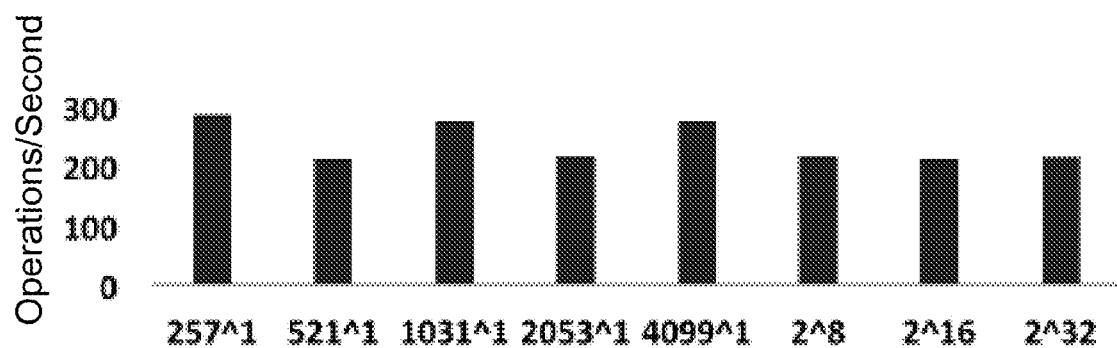
FIG. 11A is a plot showing the number of operations per second achieved with an embodiment of a key value store under different schemes.

FIG. 11A shows the number of operations per second achieved with the prototype embodiment under different settings for homomorphic processing values (e.g., plain text field size). The horizontal axis of the plot represents settings needed to generate the space for processing. For instance, p=2, r=32 would be 32-bit arithmetic, p=2, r=8 would be 8-bit arithmetic. The actual throughput of the HE processing engine 38 was measured in the prototype embodiment of the KVS system 10 described above. For this experiment, all data was assumed to be stored in the KVS. The actual throughput of the HE processing engine 38 was evaluated ignoring the time taken for compression, encryption, and decryption. In most cases, over 200 operations/second were achieved. Note that the public keys for each client have already been loaded in memory, and the only operations performed were simple additions, multiplications, and subtractions.

Further experiments were performed on the prototype embodiment of the KVS system 10. For example, experiments were performed to evaluate the efficiency of live migration of virtual machines within a 1 Gigabit Ethernet Local Area Network (LAN). The objective was to analyze the time to migrate a virtual machine from a Source Host to a Destination Host. The first set of experiments were designed to analyze how the Virtual Machine memory usage impacts the migration time. Note that the memory used by the virtual machine differs from the over-all memory available to the virtual machine. Another set of experiments were designed to analyze how network conditions impact the migration time.

For the experiments mentioned immediately above two laptops and a workstation were used. Each laptop was a HP® EliteBook 8570w with 16 GB RAM, and the workstation was a HP Z420 with 16 GB RAM. One of the laptops was used as the Source Host, and the other as the Destination Host. The workstation served as a network file system (NFS) storing the virtual machine's disk image. The operating system used on the virtual machines for the experiment was Ubuntu 14.04 LTS. The hypervisor deployed on the Source Host and Destination Host was a modified version of Ubuntu 12.04 LTS running a custom build of Xen 4.3. The Linux kernel version used was 3.8.0. The XL tool stack was used within the Xen hypervisor to create the virtual machines and migrate them. A custom set of Python® scripts were built to simplify the usage of XL when running the experiments. Each virtual machine's attached storage is comprised of a disk image stored on a centralized server. Both the Source Host and Destination Host are connected to the centralized server that stores the disk image in an NFS share. The live migration process copies memory pages from the Source Host to the Destination Host; the migration process does not migrate the actual disk storage attached to the machine—referred to as "control migration" as opposed to control and data migration. To scale the experiment, the size of the memory used was increased by increments of ten percent, from ten percent to ninety percent. In order to do this, a tool was built which allows one to incrementally increase the memory used by a virtual machine. This tool consists of a C program which dynamically allocates memory in increments—each increment representing ten percent of the total amount of unused memory.

Figure 11B:
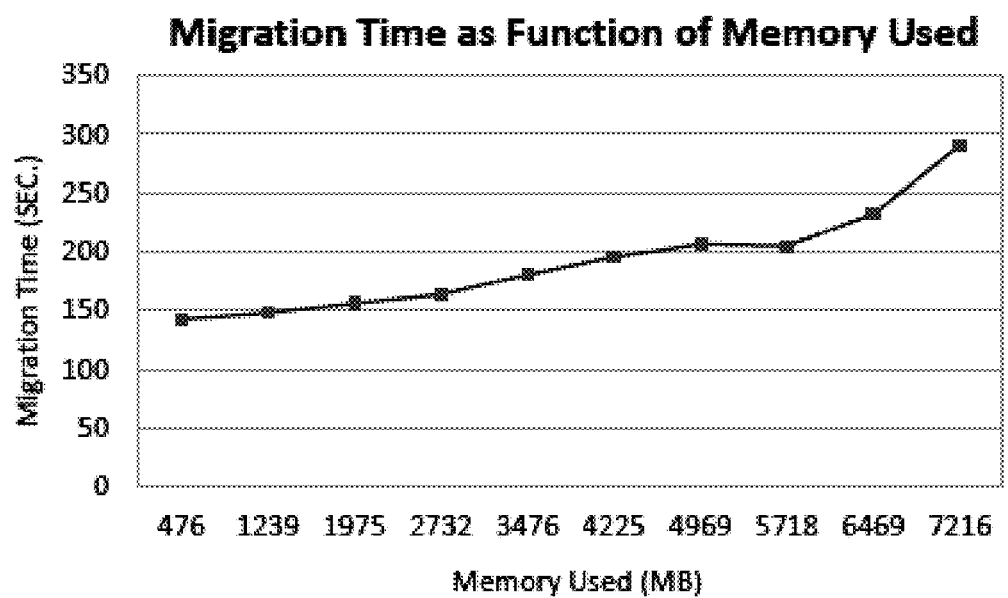
FIG. 11B is a plot of migration time as a function of memory used in an embodiment of a key value store.
Figure 12A:
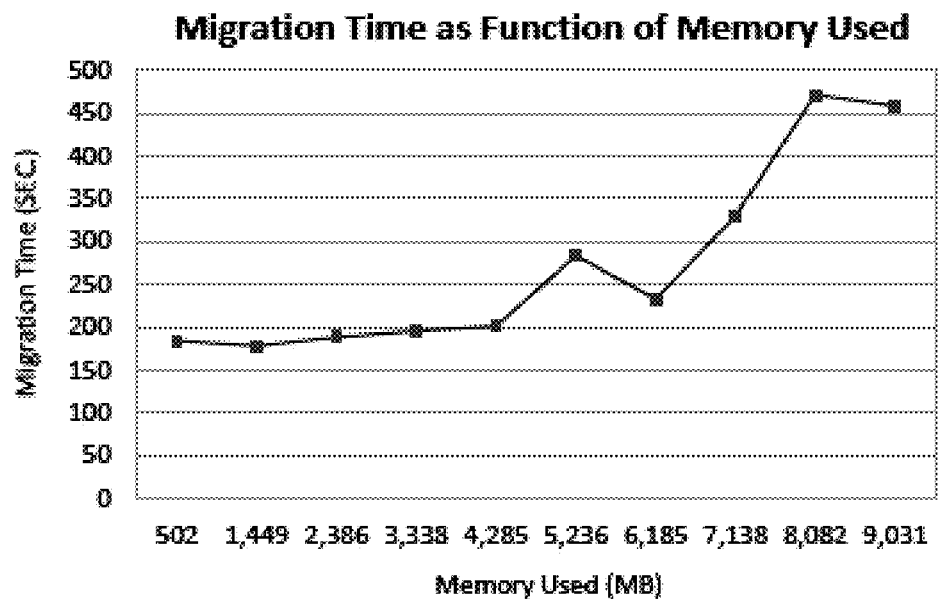
FIG. 12A is a plot of migration time as a function of memory used in an embodiment of a key value store.
Figure 12B:
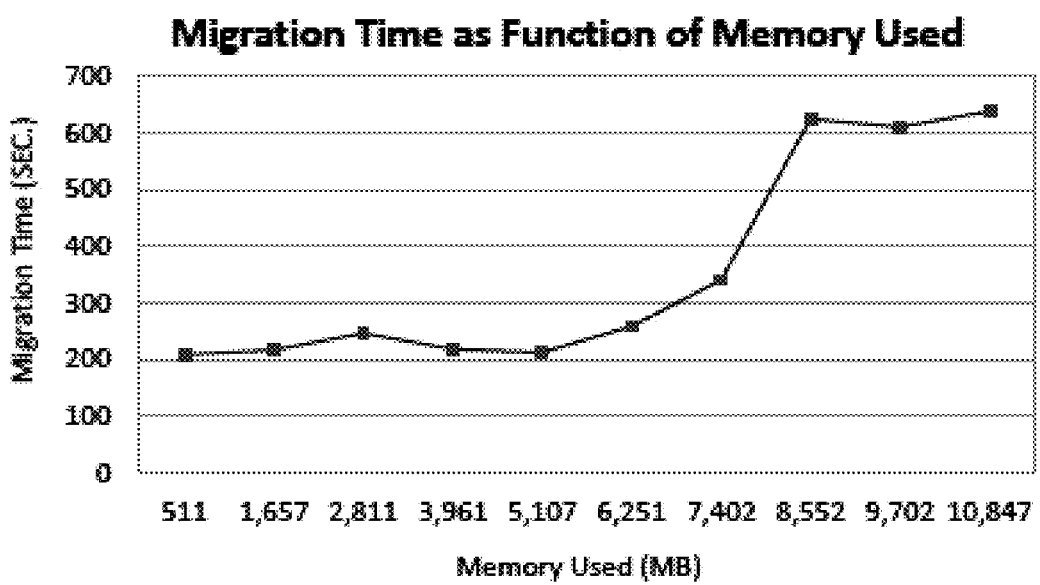
FIG. 12B is a plot of migration time as a function of memory used in an embodiment of a key value store.

FIGS. 11B, and 12A-12B show migration time as a function of the memory used on the virtual machine. The specifications of both the Source Host and Destination Host are identical. FIG. 11B shows the time taken to migrate the virtual machine as the amount of used memory on the virtual machine is increased from 10% to 90% for a virtual machine with 8 GB of memory. FIG. 12A shows the time taken to migrate the virtual machine as the amount of used memory on the virtual machine is increased from 10% to 90% for a virtual machine with 10 GB of memory. FIG. 12B shows the time taken to migrate the virtual machine as the amount of used memory on the virtual machine is increased from 10% to 90% for a virtual machine with 12 GB of memory.

Figure 13:
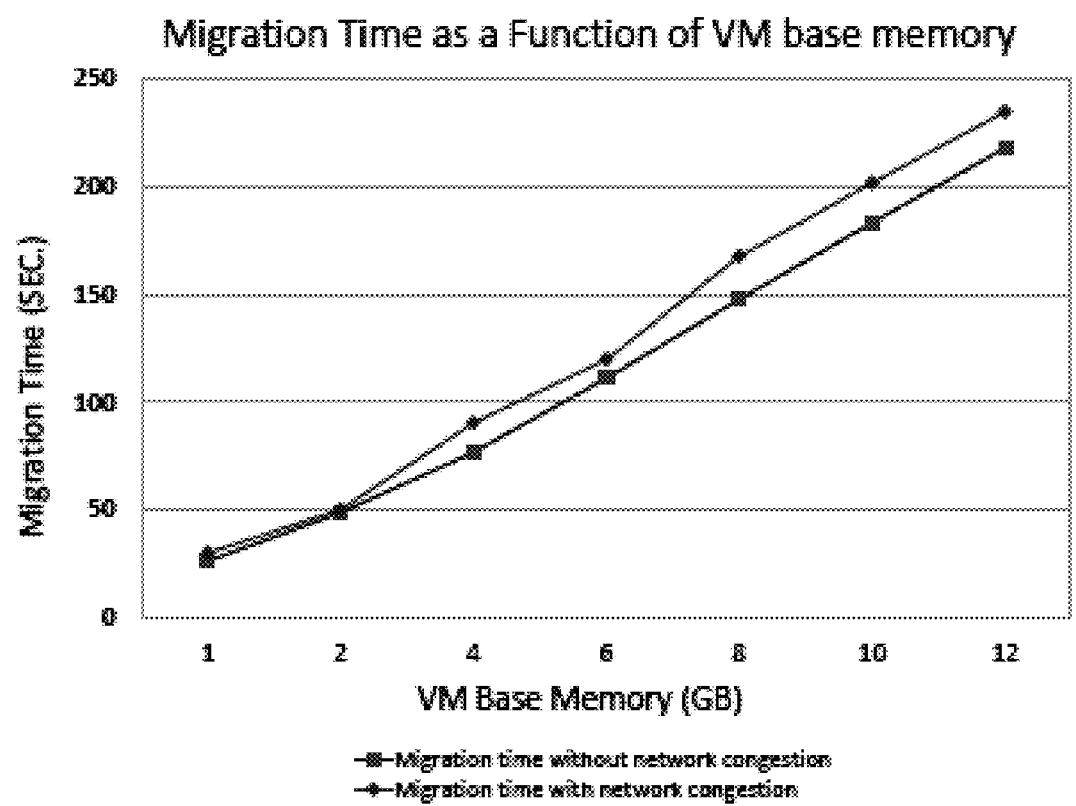
FIG. 13 is a plot of migration time as a function of virtual machine base memory.

FIG. 13 shows the results of an experiment where network congestion was simulated in order to measure its impact on the time taken to migrate a virtual machine. In order to decrease available network bandwidth, a file transfer over the network from the Source Host to the Destination Host was first initiated, then a virtual machine from the Source Host to the Destination Host was simultaneously migrated. The file transferred was 20 GB in size and was transferring for the whole duration of the virtual machine migration. The memory size of the virtual machine was varied from 1 GB to 12 GB while running only the operating system and no other processes. FIG. 13 compares migration times with and with-out the file transfer occurring over the network. Even though the Xen live migration process uses a dynamic rate-limited migration algorithm to minimize network congestion, FIG. 13 shows that migration time is still impacted by the available network bandwidth.

When each virtual machine has from 1 GB to 6 GB of total RAM, then the increase in migration time is linear as a function of the memory used on the virtual machine (e.g., see FIG. 11B). However, when the virtual machine memory capacity is increased beyond 6 GB, then the increase in migration time becomes exponential as a function of memory used (See FIGS. 11B and 12A-12B).

From the above description of the KVS system 10, it is manifest that various techniques may be used for implementing the concepts of the KVS system 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the KVS system 10 is not limited to the particular embodiments described herein, but is capable of many embodiments without departing from the scope of the claims.

I claim:
1. A key value storage (KVS) system comprising:
a client-side agent comprising a homomorphic crypto engine and configured to fully homomorphically encrypt data, wherein only the client-side agent can decrypt the data;

first, second, and third nodes hosted respectively in first, second, and third cloud service providers, wherein each of the first, second, and third nodes comprises:
   a management node communicatively coupled to the client-side agent,
   a homomorphic encryption (HE) key manager communicatively coupled to the management node and configured to fetch a public key of a given object in the KVS system to enable object key to public key mapping,
   a homomorphic encryption and processing engine communicatively coupled to the management node and configured to execute commands over the encrypted data without decrypting it,
   a homomorphic memory store communicatively coupled to the management node,
   a hypervisor communicatively coupled to the management node and configured to monitor performance of the management node in order to assess the quality of service of the management node; and
wherein each of the first, second, or third nodes serves on a rotating basis in a master node role, a secondary node role, or a back-up node role, wherein the first, second, and third nodes rotate their roles through live migration when the master node's hypervisor detects a reduced quality of service of the master node's management node.

2. The system of claim 1, wherein the first second and third nodes are hosted on virtual machines.

3. The system of claim 2, wherein each hypervisor monitors side-channel metrics of its corresponding virtual machine.

4. The system of claim 3, wherein the side-channel metrics are selected from the group consisting of: CPU utilization, memory utilization, network utilization, and time of day.

5. The system of claim 3, wherein the side-channel metric monitored by each hypervisor is the energy level of its corresponding virtual machine.

6. The system of claim 2, wherein the virtual machine hosting a given node is of a different type from the types of virtual machines hosting the other nodes.

7. The system of claim 1, wherein each hypervisor is configured to use machine learning to monitor performance of its corresponding management node.

8. The system of claim 1, wherein each of the first, second, and third nodes further comprises a compression engine communicatively coupled to the management node.

9. The system of claim 1, wherein each node performs its functions without compressing/decompressing data.

10. A method comprising the following steps:
   a. hosting first, second, and third nodes respectively in first, second, and third cloud service providers;
   b. assigning the first node to serve as a master node, the second node to serve as a secondary node and the third node to serve as a back-up node;
   c. receiving, with the master node, fully homomorphically encrypted data from a client-side agent;
   d. homomorphically processing, with the master node, the encrypted data without decrypting the encrypted data by executing commands over the encrypted data;
   e. storing the encrypted data in the master node;
   f. fetching, with the master node, a public key of a given object to enable object key to public key mapping;
   g. monitoring performance of the master node in order to assess the quality of service of the master node;
   h. performing a live migration by taking the first node offline, reassigning the second node to serve as the master node, and reassigning the third node to serve as the secondary node in the event of a system failure or degradation of service in the first cloud service provider; and
   i. bringing the first node back online to serve as the back-up node after the system failure or degradation of service no longer exists in the first cloud service provider.

11. The method of claim 10, wherein the first second and third nodes are hosted on virtual machines.

12. The method of claim 11, wherein when the first node is brought back online, the first node is brought back on a virtual machine that is of a different type from the type of virtual machine that was running at the time of the system failure or degradation of service.

13. The method of claim 10, wherein the monitoring step is performed by monitoring side-channel metrics of the master node.

14. The method of claim 13, wherein the side-channel metric of the master node that is monitored is the energy level of the master node.

15. The method of claim 13 wherein the side-channel metrics that are monitored are only metrics that can be monitored in a non-intrusive manner such that the monitoring has no effect on the master node.

16. The method of claim 13, wherein the side-channel metrics are selected from the group consisting of: CPU utilization, memory utilization, network utilization, and time of day.

17. The method of claim 10, further comprising the step of using neural networks to learn to identify a system failure or degradation of service in the first cloud service provider.

18. The method of claim 10 further comprising the step of compressing/decompressing the encrypted data.

19. The method of claim 10, wherein steps d-g are performed without compressing the encrypted data.

* * * * *